Nov. 21, 1939.  G. DE BOTHEZAT  2,180,922
HELICOPTER DEVICE
Filed July 24, 1936  3 Sheets-Sheet 1

INVENTOR
G. de Bothezat
BY
Edwards, Bower & Howl
ATTORNEYS

Nov. 21, 1939.  G. DE BOTHEZAT  2,180,922
HELICOPTER DEVICE
Filed July 24, 1936   3 Sheets-Sheet 2
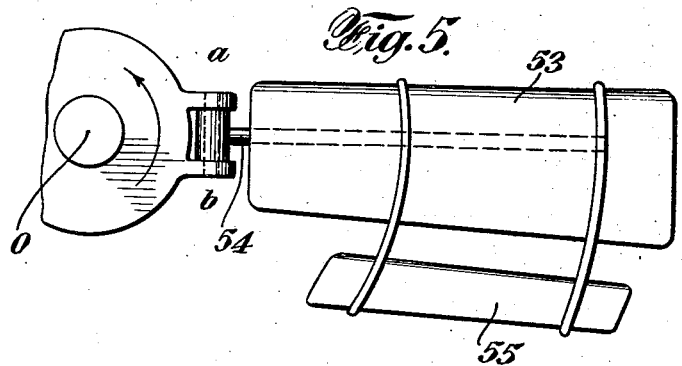
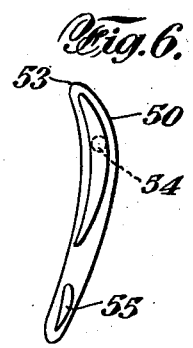
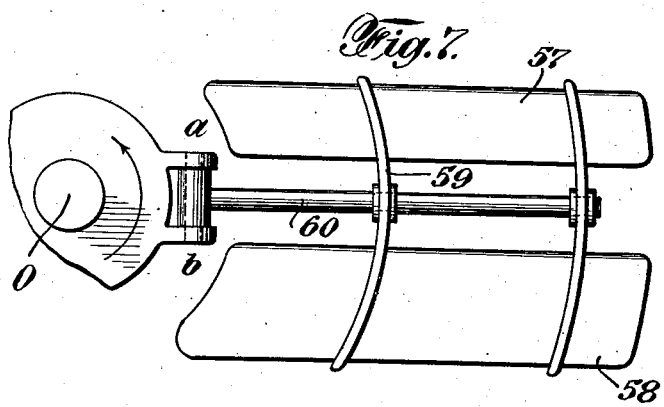
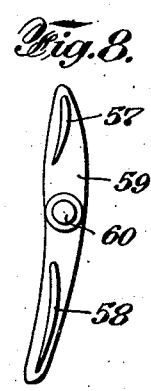
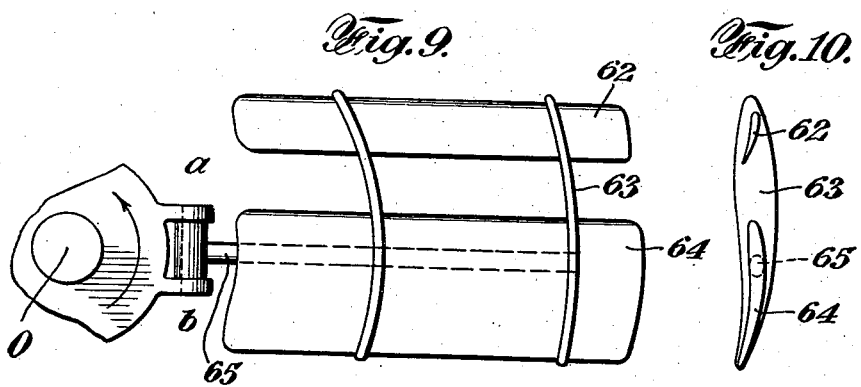
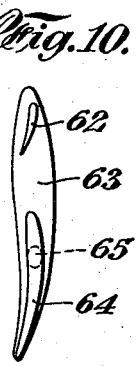

Patented Nov. 21, 1939

2,180,922

UNITED STATES PATENT OFFICE 2,180,922

HELICOPTER DEVICE

George de Bothezat, New York, N. Y., assignor to Helicopter Corporation of America, Long Island City, N. Y., a corporation of New York Application July 24, 1936, Serial No. 92,307

16 Claims. (Cl. 244—17)

This invention relates to flying devices of the helicopter type and particularly to such a device adapted for lifting a part or all of the weight of the user.

The primary object of the invention is to provide a helicopter device permitting the user to walk and run much faster and jump higher than normally.

Another object of the invention is to provide such a device which, when desired, will lift and transport the user under simple control and manipulation by him.

A further object of the invention is to provide such a helicopter device which will be simple and light in structure and inexpensive in cost.

Further objects of the invention, particularly in providing for a gliding action and insuring safe operation at all times, will appear from the following specification taken in connection with the accompanying drawings, in which Fig. 1 is a perspective view showing one form of the machine of this invention attached to the user.

Figs. 5, 7 and 9 are plan views of modified forms of helicopter screw blades for use in the machine of this invention.

Figs. 6, 8 and 10 are end views of the blades of Figs. 5, 7 and 9 respectively.

Figure 1:
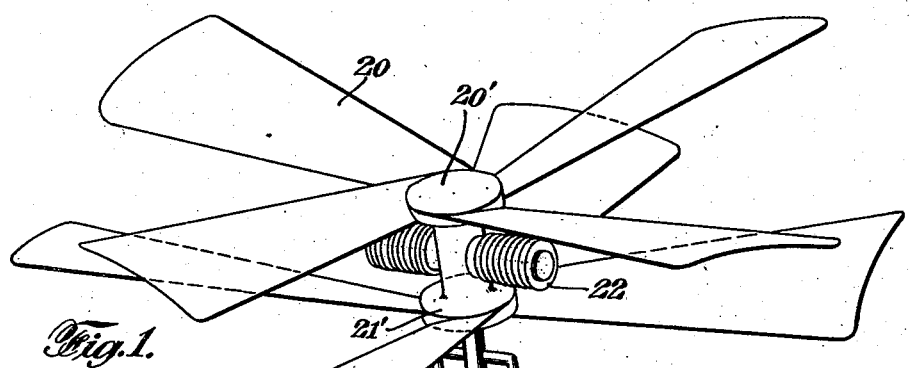

In the specific embodiment of the invention shown in Fig. 1, the paired helicopter screws 20, 21 are mounted on and driven by the air cooled internal combustion engine 22 located between the screws. The engine 22 is of the two-cylinder type and preferably has its crank shaft connected to the screws 20, 21 through reducing gears within the casing and screw hubs 20', 21', so that the screws rotate at speeds lower than the engine speeds.

The screws 20, 21 are driven with equal torques in opposite directions so that the torques mutually balance. When the engine 22 is driving the screws 20, 21 they exert a lifting force dependent upon the speed of rotation, and when the engine ceases to drive the screws they are rotated in the opposite direction by the downward movement and act by their rotation to give a supporting or gliding action as hereinafter explained.

The whole system of lifting screws and the driving engine is mounted on a hollow steel tube 25, the lower end of which is attached to the steel tubing frame 26, 27 which in turn is attached to the body of the flier by a belt 30 and sets of shoulder straps 28, 29 and leg or saddle straps 31. These parts are so arranged and proportioned that the weight of the machine is carried in front by the user and the resultant lifting force exerted by the screws 20, 21 is in front and inclined forward from vertical. When the lifting screws are not running the weight of the apparatus is borne by the belt 30 and shoulder straps 28, 29 and is applied through the frame tangent to the body of the user. When the air screws are lifting, the weight of the flier is mainly supported by the leg straps 31. The frame and straps are arranged to leave freedom of motion of the flier so as not to hinder in any way his walking or jumping while on the ground, and his control of the apparatus by body, leg and arm movement while in the air.

Figure 2:
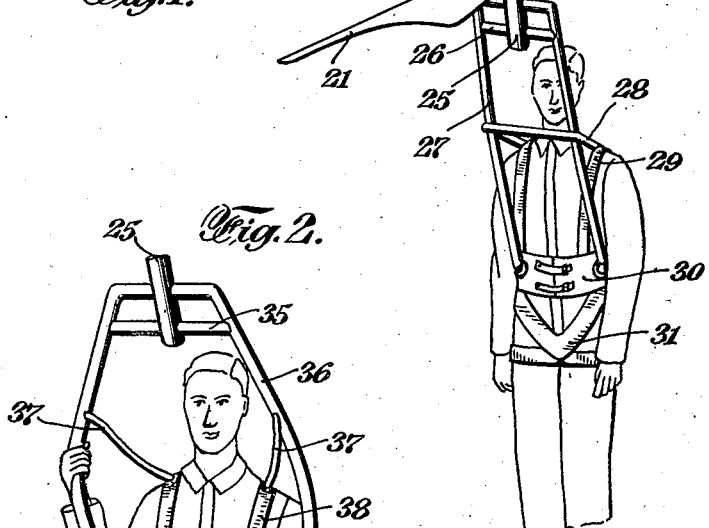
Fig. 2 is a partial view of the modified form of the attaching means.

For certain applications of the machine the operator may have to bend and kneel forward or it may be desirable to have the resultant thrust support the operator from the rear, as for example in mountain climbing. In such cases the supporting frame may preferably be given such shape that the upper part of the user's body can pass readily through the frame so that the frame can be swung backwards and forward. In such case the frame, as shown for instance in Fig. 2, will be attached to the tube 25 by cross tubes 35 and bowed frame tubes 36 so mounted as to be able to rotate around the belt connection joints 41, 42, the flexible shoulder straps 37 being loose for this purpose to permit limited forward and backward movement of the frame, and attached to the suspender straps 38 connecting to the belt 39 which in turn is attached to the saddle straps 40.

Figure 3:
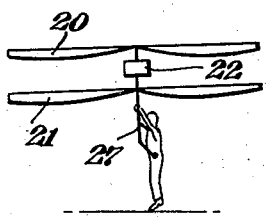
Figs. 3 and 4 are diagrammatic elevational views illustrating the use and control of the machine.
Figure 4:
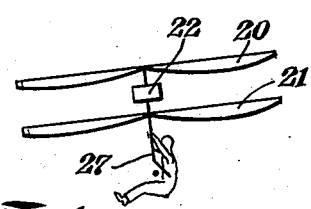

As shown in Fig. 3, the user as he leaves the ground has the apparatus tilted forward and then as shown in Fig. 4 moves the center of gravity forward to maintain the forward tilted inclination of the device and develop a forward component of the lifting effort of the screws.

The flier can, on the ground as well as in the air, modify the inclination of the axis of the air screws by changing the position of his body and shifting his legs forward and backward and from side to side. For example, by bending backwards the flier will be able to give a vertical orientation to the axis of the air screws, bringing the center of gravity in vertical alinement with the axis of the lifting force.

The engine can be started by the flier himself reaching and turning the lower screw 21 with his hands. The throttle and ignition are hand controlled, the connections passing from the engine down through the tube 25 to be positioned on the frame structure within easy reach of the flier or having flexible extensions for the same purpose.

The gasoline and oil tanks will be either attached to the frame work or carried on the back of the flier by the shoulder or belt straps. The tubing 25 may be made to extend through at the top and have the gasoline and oil tanks attached above both lifting screws.

The engine 22 can be any type of gasoline air-cooled engine preferably disposed in the slip stream produced by the lifting screws 20, 21 in order to secure the resulting cooling. Large diameter air screws are required for efficient lifting and to give sufficient blade area to insure proper gliding or restrained vertical descent when the motor is not driving.

When the apparatus is intended only for lifting part of the weight of the user so that each jump or hop is followed immediately by a return to the ground, the simpler type of lifting screws, shown in Fig. 1, are preferable. The flier controls the behavior of the machine by his skill in body movements. For this use as a hopping device the engine throttle is so adjusted that the air screws lift almost all of the weight of the machine and the flier. The flier will then be able to make very big jumps in height and length as a sport or in military use.

When, as illustrated in Fig. 1, the lifting screws 20, 21 are built rigid, the upward dihedral angle given to the blades as shown will contribute to the stability of the machine. When these screws 20, 21 with one 21 disposed in the slip-stream of the other 20 produce a combined slip-stream free of any rotation in the discharge, their torques mutually balance as a direct dynamical balance.

In order to achieve this the following air screw 21 must have a smaller pitch and smaller width ratio than the leading screw 20. Width ratio is defined as the ratio of the blade width times the number of blades to the length of the circumference where the blade width is measured.

Where the machine is intended for use for sustained flying a substantial saving in weight would be attained by the use of suspended or hinged blades. Such blades will also decrease the sensitiveness of the machine to side wind gusts. Blade suspension of this type is called simple when the blades are attached to their hub bosses by hinges, the axes of which are perpendicular to the general axis of rotation, as shown schematically in Fig. 5 where $a, b$ is the axis of blade suspension, the axis of rotation being perpendicular to the plane of the sheet and indicated at O. When recourse is had to this simple suspension the moment being the blade and produced by the lift component is entirely eliminated. In this case the blade 50 for instance (Figs. 11 and 12) is held in balance around its hinge 51 by the balancing of the lifting force and the centrifugal force. Under such conditions the blade is subject only to the bending moment due to the air resistance torque, but this is much smaller than the bending moment due to the lift; because the drag of the blades is of course much smaller than their lift in a ratio of about 1 to 20 and blades are also much more resistant to lateral bending, that is, bending in the plane of the blades. A stop will of course be provided preventing the blades from dropping when the air screws are not rotating.

The bending of the blades may be entirely eliminated by attaching the blades to their bosses with the aid of universal joints, one axis of the joint being perpendicular to the axis of rotation, the other parallel to said axis. This is called double suspension of the blades and in this case the blades, when rotating, take such orientation that in relation to the universal joint the resultant air action on each blade is entirely balanced by the centrifugal force of the blade. The blade is exclusively subjected to a force of extension.

Figure 13:
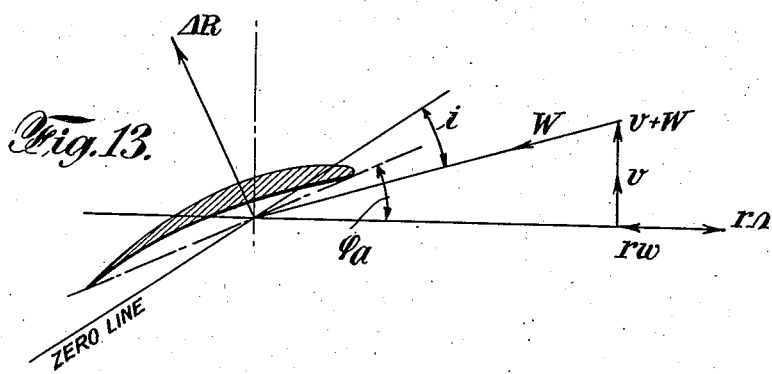
Figs. 13 and 14 are sectional views illustrating the action of the helicopter screw blade in lifting and in gliding actions respectively.

In order to secure the gliding of the machine especially when used in sustained flying, further considerations are involved. The relative air flow and the resultant air pressure on a blade section when the latter is power rotated by its shaft and acting as a lifting screw, are shown on Fig. 13 where $r\Omega$ is the velocity component of the blade section under consideration located at the distance $r$ from the shaft and due to the angular velocity $\Omega$ of the shaft. $r\omega$ is the race rotation; $v$ the slip velocity; $w$ the velocity of ascent of the lifting screw; W the true air velocity of the relative air stream meeting the blade section in its motion; $i$ the true incidence (or angle of attack) referred to the zero line (zero lift line) of the section under consideration; $\Delta R$ is resultant air pressure upon the blade section.

Figure 14:
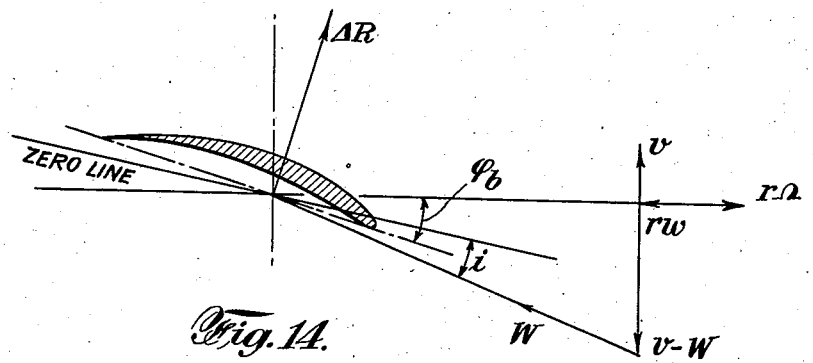

When the motor is shut off the machine will begin to descend and the velocity $w$ will become a velocity of descent, that is, it will have its sense reversed and its magnitude somewhat increased. Now assuming the blade to keep its sense of rotation, the relative flow of velocity W will shift to the position indicated in Fig. 14, and in order to maintain said blade rotating in the same sense the blade angle $\phi_a$ (in other words, the pitch of the blade) will have to be modified and given the negative value $\phi_b$. Only then will the rotation of the lifting screws in the same direction be maintained. Therefore, in order to insure the descent or gliding of the machine without reversing the sense of rotation of the air screws the blade angle of the blades of the air screws must be changed from $\phi_a$ to $\phi_b$. This can be attained by any hand mechanism varying the pitch of the air screws, numerous types of which have recently been developed in connection with variable pitch propellers.

It is much more practical, however, to have this pitch variation automatic whenever the engine is shut off (or even slowed down) without the flier having to worry about this pitch variation. Such automatic pitch variation of a lifting screw insuring the shift from ascent to gliding without reversal of the sense of rotation may be attained by blade constructions of the type shown in Figs. 5 to 10 inclusive.

The blades are rotatably mounted on radial arms as shown by the blade 53 of Fig. 5 rotatably mounted on the arm 54, and the blades are so designed as to have a powerful aero-dynamical restoring moment in relation to their axes of rotation (the arms 54), maintaining the blades all the time under a constant angle of attack or incidence. As shown diagrammatically in Figs. 5, and 6, the blade 53 rotatably mounted on the arm 54 is maintained under constant incidence by a tail plane 55.

Another arrangement is shown diagrammatically in Figs. 7 and 8, giving a constancy of the incident angle in the use of a tandem blade 57, 58 joined by bracket members 59 rotatably mounted on the arm 60. It can be shown that with such an arrangement the substantially perfect maintenance of blades under constant incidence is attained when the two tandem blades are so proportioned that the front one 57 has a smaller area but a larger blade angle than the rear half blade 58, both producing equal and opposite moments in relation to the axis of rotation. This arrangement secures a powerful restoring moment and powerful damping, at the same time insuring maintenance of a constant incidence.

Blades maintaining such a constant incidence will automatically pass from an orientation such as $\phi_a$ to an orientation such as $\phi_b$ when the machine passes from power flying to gliding. A structural modification of this tandem construction is shown in Figs. 9 and 10 where the leading blade 62 is supported by brackets 63 from the following blade section 64 mounted rotatably on the arm 65.

An aerofoil system such as is shown in Figs. 5 to 10 inclusive has usually two stable settings in an air stream—a direct and a reverse setting. In order to prevent the system from taking the wrong setting two stops should be provided on the blade arms permitting the swing around the radial axis only within the angle avoiding a reverse setting while permitting the desired setting.

Figure 11:
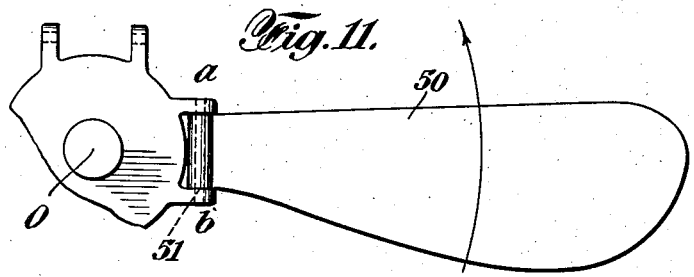
Fig. 11 is a plan view of a further modified form of helicopter screw blade with sectional form of the blade illustrated on the plan view.
Figure 12:
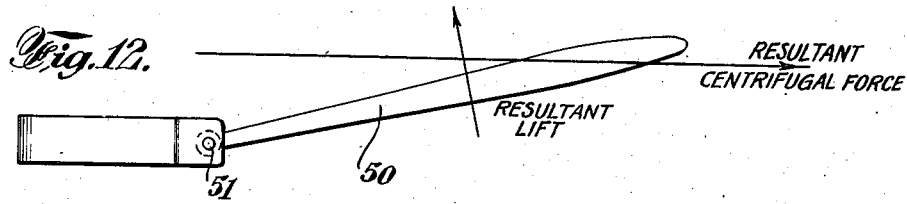
Fig. 12 is an edge view of the blade shown in Fig. 11.

Thus the preferred blade for the flying form of this machine is the rotary tandem type, rotary around the radial blade arm, and doubly suspended in being attached to the boss of the hub by a universal joint involving a hinge $a$, $b$, Figs. 5 and 11, and another intersecting hinge at right angles thereto. Such blade will be very light because it is not subjected to any other effort but straight extension and will act resiliently in relation to wind gusts, substantially smoothing out the transmission of the perturbing variations so that even effort is applied to the body of the machine. It will also automatically set itself to the gliding pitch maintained sense of rotation when the engine is not driving. The rotary tandem blade with simple suspension is also practical and advantageous and may be preferred in some constructions.

Without entering into detailed explanations it should be noted that with self-setting constant incidence blades the stability conditions are modified and with such types of blades it is the downward dihedral that forms the stable type of lifting screw, this being just the reverse from the case of blades of invariable pitch or invariable blade angle.

Lifting screws capable of a lifting effort of about twenty pounds per horsepower are practical and economical. Such screws giving lifts of one hundred pounds per horsepower have been demonstrated but are usually of excessively large diameter. In the present construction with the motor 22 of 15 horsepower, a total lift of about three hundred pounds can be readily secured with lifting screws having a diameter of about 10 feet.

With a man weighing about 175 pounds and the engine weighing about 30 pounds, together with the planetary reduction gears and the pair of lifting screws weighing about 15 pounds each and a frame with belt and straps weighing about 20 pounds, the total load to be lifted would be about 260 pounds, the machine itself weighing about 75 pounds. A small gasoline tank with gas for several hours would not exceed 20 pounds in weight, leaving an excess lifting effort of about 25 pounds as a conservative estimate.

This lifting effort is under the complete control of the operator or flier so that he may either lighten his weight to desired degree or lift it altogether. In either case he has control of the direction of movement by manipulation of the relation between his body weight and the lifting effort because when on the ground he can always tilt the excess of the lift to desired direction and inclination, and when in the air can always manipulate the center of gravity to cause a corresponding tilt. In rising from the ground it is of course preferred to face into the wind so that the component of forward progress is opposed to the direction of the wind.

The helicopter device of this invention is simple and light in construction, inexpensive in manufacture, and efficient and adaptable in use, and permits of running, hopping and flying feats heretofore impossible of attainment.

When the machine is used as an actual flying machine guiding and controlling flaps and fins attached to the body or arms of the flier may be desirable in order to insure full regulation of the flying. For instance, in turning around a vertical axis a flat blade on the arm of the user could be raised in the air stream to permit the flier to shift to the desired direction. Similarly a tail or rudder fin fastened to the flier's back would tend to maintain this direction and assist in damping any oscillations of the turning movement.

I claim:

1. In a machine of the helicopter type a plurality of lifting screws, the torques of which balance, a gasoline engine for driving said screws, and carrying means having a frame structure connected to support said engine and screws above the operator and leaving the operator's legs free to walk, run and the like and to act as landing gear while carrying said machine, said frame structure including two members extending from the engine and screws above the operator down along either side of the operator, and also including means for fastening both of said members to the body of said operator.

2. A machine as described in claim 1, in which the thrust of the lifting screws passes in front of the body of the operator.

3. A machine as described in claim 1, in which the carrying means fastened to the operator permits the system of lifting screws to swing around an axis perpendicular to the plane of symmetry of the body of the operator.

4. A machine as described in claim 1, in which the machine is adapted to exert an upward lift less than the total weight of the operator so that said machine acts as a hopping device.

5. A machine as described in claim 1, in which the machine is adapted to exert an upward lift less than the total weight of the operator so that said machine acts as a hopping device in which the thrust of the lift screws passes in front of the body of the operator.

6. A machine as described in claim 1, in which the machine is adapted to exert an upward lift less than the total weight of the operator so that said machine acts as a hopping device in which the carrying means fastened to the operator permits the system of lifting screws to swing around an axis perpendicular to the plane of symmetry of the body of the operator.

7. A machine as described in claim 1, in which the thrust of the lifting screws passes in front of the operator and is slightly inclined forward in relation to the normal position of the operator.

8. A machine as described in claim 1 in which said frame structure terminates at the waistline of said operator and said fastening means permits movement of said frame around an axis perpendicular to the plane of symmetry of the body of the operator.

9. In a machine of the helicopter type two lifting screws, the blades of each screw forming an upward dihedral angle and one screw being disposed in the slip stream of the other and the torques of the screws mutually balancing, a gasoline engine driving said screws and located between them, and carrying means fastening the machine to be carried by the operator in a position vertically above him and leaving his legs free to act as a landing gear.

10. A machine as described in claim 9, in which thrust of the lifting screws passes in front of the body of the operator.

11. A machine as described in claim 9, in which the carrying means fastened to the operator permits the system of lifting screws to swing around an axis perpendicular to the plane of symmetry of the body of the operator.

12. In a machine of the helicopter type two lifting screws, the blades of each screw forming a downward dihedral angle and being self setting, maintaining substantially constant incidence, one screw being disposed in the slip stream of the other and the torques of the screws mutually balancing, a gasoline engine driving said screws and located between them, and carrying means of fastening the machine to be carried by the operator in a position vertically above him and leaving his legs free to act as a landing gear.

13. A machine as described in claim 1, in which each blade of the screws is rotatably mounted around an axis at a right angle to the axis of the screws so as to be self adjusting around said axis.

14. A machine as described in claim 1, in which each blade of the screws is tandem bladed and rotatably mounted around an aris in a plane substantially radial to the axis of the screw so as to be self adjusting around said axis.

15. A machine as described in claim 1, in which each blade of the screws is tandem bladed and rotatably mounted around an axis in a plane substantially radial to the axis of the screw and also around an axis at a right angle to said screw axis so that said blade will be self adjusting around both of said axes.

16. A machine as described in claim 1 in which each blade of the screws is tandem bladed and rotatably mounted around an axis in a plane substantially radial to the axis of the screw and also connected to the screw hub by a universal joint, one axis of which is at right angles to the axis of rotation of the screw, and the other axis of which is parallel to said axis of rotation.

GEORGE DE BOTHEZAT.